US010718896B2

(12) United States Patent
Iwata

(10) Patent No.: US 10,718,896 B2
(45) Date of Patent: Jul. 21, 2020

(54) DISPLAY DEVICE AND TELEVISION RECEIVER

(71) Applicant: SHARP KABUSHIKI KAISHA, Sakai, Osaka (JP)

(72) Inventor: Hiroki Iwata, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/280,653

(22) Filed: Feb. 20, 2019

(65) Prior Publication Data
US 2019/0257997 A1    Aug. 22, 2019

(30) Foreign Application Priority Data

Feb. 21, 2018  (JP) ................... 2018-029125

(51) Int. Cl.
*F21V 8/00* (2006.01)
*H04N 5/64* (2006.01)

(52) U.S. Cl.
CPC ........... *G02B 6/009* (2013.01); *G02B 6/0085* (2013.01); *G02B 6/0088* (2013.01); *G02B 6/0068* (2013.01); *G02B 6/0073* (2013.01); *H04N 5/64* (2013.01)

(58) Field of Classification Search
CPC .... G02B 6/009; G02B 6/0091; G02B 6/0085; G02B 6/0088; G02B 6/0068; G02B 6/0073; H04N 5/64
See application file for complete search history.

(56) References Cited

U.S. PATENT DOCUMENTS

| 8,958,022 B2* | 2/2015 | Youk ................. G02B 6/0083 349/58 |
| 2011/0085107 A1 | 4/2011 | Noh et al. |
| 2014/0185324 A1 | 7/2014 | Noh et al. |
| 2014/0226073 A1* | 8/2014 | Kamada ............ G02F 1/133512 348/725 |

FOREIGN PATENT DOCUMENTS

JP    2011/082176 A    4/2011

* cited by examiner

*Primary Examiner* — Joseph L Williams
*Assistant Examiner* — Jose M Diaz
(74) *Attorney, Agent, or Firm* — ScienBiziP, P.C.

(57) ABSTRACT

A display device includes: a display panel that displays an image on a front thereof; a light-guiding plate placed opposite to a back of the display panel; a storage container in which the light-guiding plate is stored, the storage container having a dish shape; a light-emitting element that supplies the display panel with light; and a light source substrate having a short side part on a first surface of which the light-emitting element is mounted and a long side part projecting inward from the first surface of the short side part, the first surface of the short side part being disposed to face a peripheral edge of the light-guiding plate, the light source substrate having a shape of letter L in cross section. In the display device, the long side part of the light source substrate and a bottom plate of the storage container are thermally connected to each other.

6 Claims, 5 Drawing Sheets

DISPLAY DEVICE AND TELEVISION RECEIVER

BACKGROUND

1. Field

The present disclosure relates to a display device and a television receiver.

2. Description of the Related Art

Liquid crystal display devices (liquid crystal displays: LCDs) have recently been widely used as display devices or the like to display pictures or images. A liquid crystal display device is configured to display an image or the like on the front of a liquid crystal panel by having a backlight disposed behind the liquid crystal panel and allowing light emitted by the backlight to be modulated and transmitted by the liquid crystal panel. In order to achieve both a reduction in power consumption and a reduction in thickness, such a liquid crystal display device has recently employed an edge-lighting backlight including an LED (light-emitting diode) as a light source (see, for example, Japanese Unexamined Patent Application Publication No. 2011-82176).

The edge-lighting backlight is configured such that a light-guiding plate and a light source are accommodated in a storage container having a rectangular dish shape. The light-guiding plate includes a transmissive flat plate made of resin and a reflective sheet covering one surface of the flat plate, and is accommodated in a casing so as to cover the bottom of the casing so that the surface covered with the reflective sheet faces the bottom.

A plurality of the LEDs serving as light sources are mounted side by side on one surface of a substrate having a rectangular shape, and are attached to the storage container with the mounted surface facing one side edge of the light-guiding plate. Light emitted by each LED enters the light-guiding plate via the opposite side edge, propagates while repeating total reflection at the reflective sheet on a first surface of the light-guiding plate and partial reflection at a second surface of the light-guiding plate, and is emitted from the whole area of the second surface of the light-guiding plate. The liquid crystal panel is put over the second surface of the light-guiding plate with an optical sheet sandwiched therebetween, and light emitted from the light-guiding plate is diffused by the optical sheet and illuminates the liquid crystal panel from behind.

An LED driven to emit light rises in temperature due to Joule heat generated by internal resistance. Further, the rise in temperature of the LED entails a rise in temperature of a light source substrate. This raises the need for heat dissipation measures. To address this problem, the display device of Japanese Unexamined Patent Application Publication No. 2011-82176 achieves heat dissipation by having a light source substrate fixed to a radiator (light source unit fixing frame) a part of which is exposed outward via an opening provided in the storage container.

However, a heat transfer area between the light source substrate and the radiator in the display device of Japanese Unexamined Patent Application Publication No. 2011-82176 is narrow, as it is limited to the area of a place where the light source substrate is fixed to the radiator. This results in poor heat dissipation efficiency.

It is desirable to provide a display device and the like that make it possible with a simple structure to efficiently dissipate heat generated by the light source substrate.

SUMMARY

According to an aspect of the disclosure, there is provided a display device including: a display panel that displays an image on a front thereof; a light-guiding plate placed opposite to a back of the display panel; a storage container in which the light-guiding plate is stored, the storage container having a dish shape; a light-emitting element that supplies the display panel with light; and a light source substrate having a short side part on a first surface of which the light-emitting element is mounted and a long side part projecting inward from the first surface of the short side part, the first surface of the short side part being disposed to face a peripheral edge of the light-guiding plate, the light source substrate having a shape of letter L in cross section, wherein the long side part of the light source substrate and a bottom plate of the storage container are thermally connected to each other.

DESCRIPTION OF THE EMBODIMENTS

Embodiment 1

Figure 1:
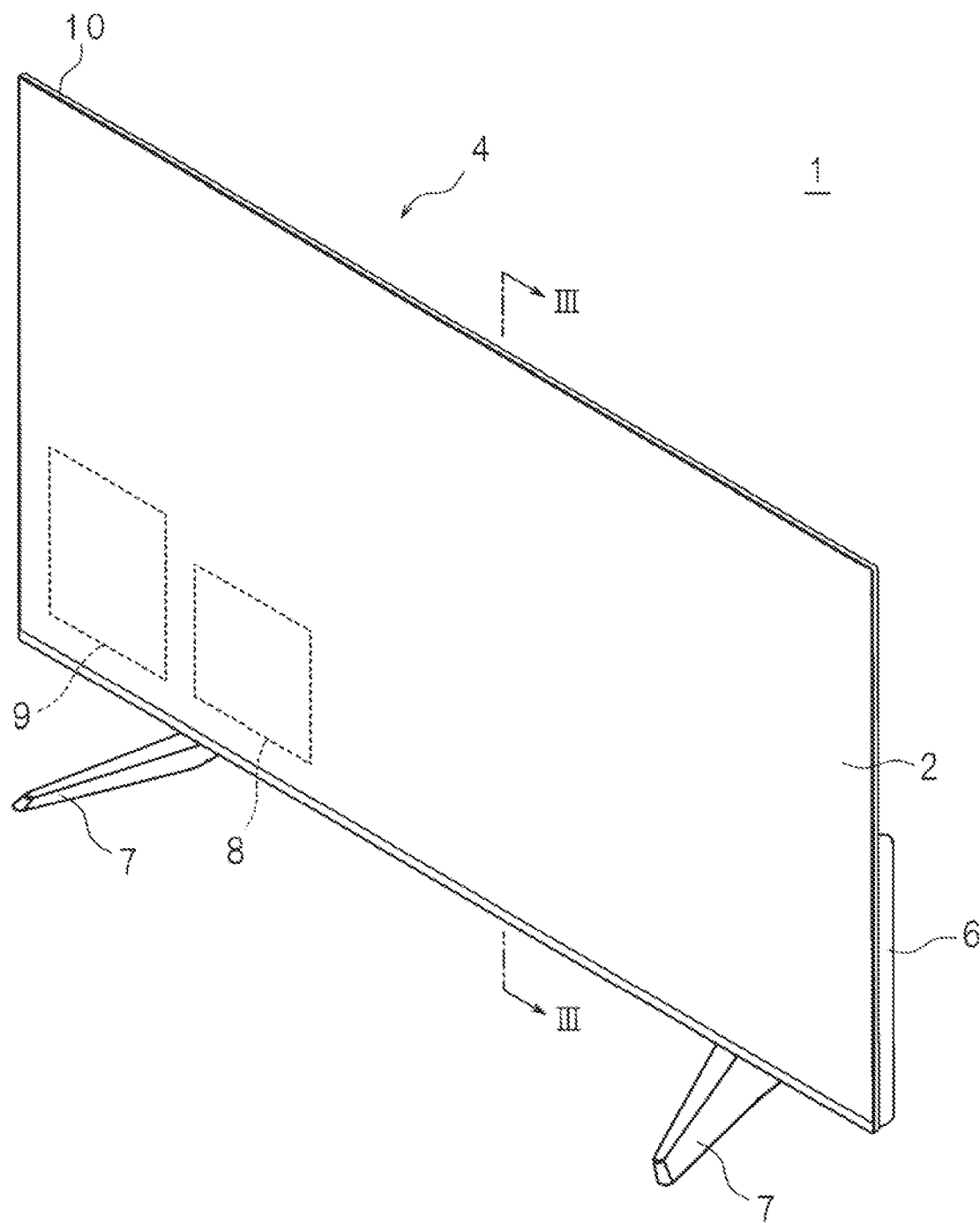
FIG. 1 is a perspective view schematically showing a display device according to Embodiment 1.
Figure 2:
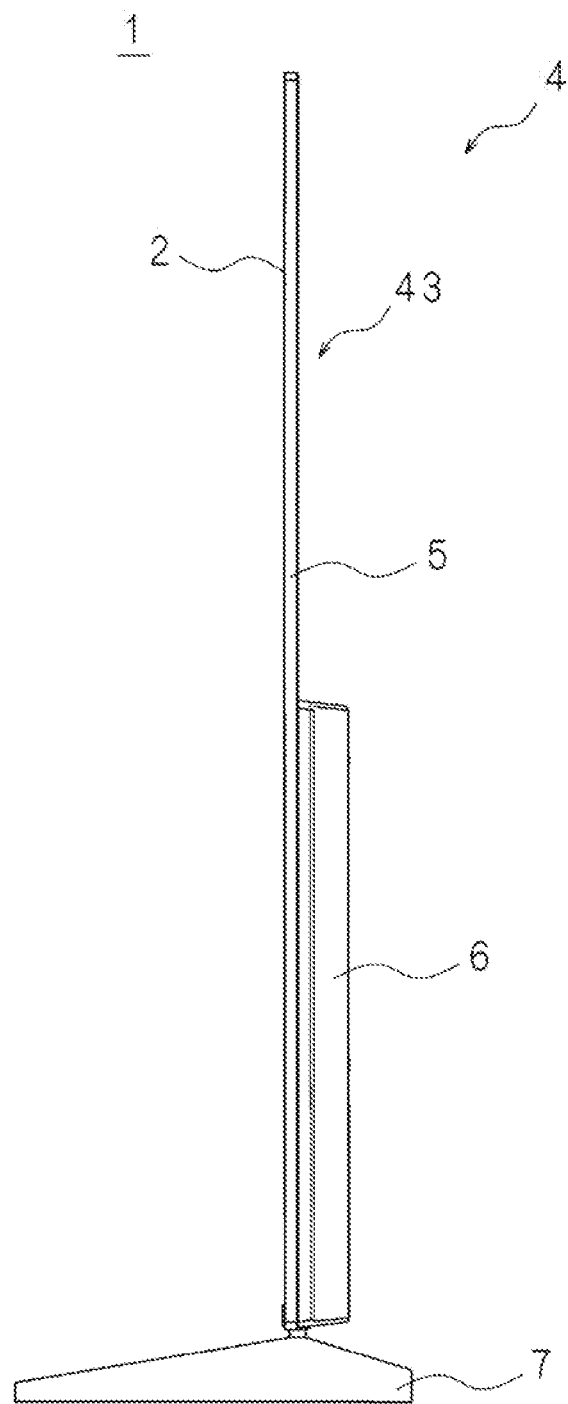
FIG. 2 is a side view schematically showing the display device.

An embodiment of the present disclosure is described below. FIG. 1 is a perspective view schematically showing a display device according to Embodiment 1. FIG. 2 is a side view schematically showing the display device. The display device is a liquid crystal display device 1 including a liquid crystal panel 2 as a display panel for use in image display. The liquid crystal display device 1 includes a backlight 4 that illuminates the liquid crystal panel 2 with light.

The liquid crystal panel 2 includes a display unit that has a rectangular plate shape and that displays an image on the front thereof. The liquid crystal panel 2 has its back covered with a backlight chassis 43 (see FIG. 3) that constitutes an outer casing of the backlight 4. The backlight chassis 43 (storage container) constitutes an exterior body of the liquid crystal display device 1.

As shown in FIG. 1, the liquid crystal device 1 is configured as a television receiver including a receiving unit 9 and a signal processing unit 8. The receiving unit 9 is connected to an antenna (not illustrated), and receives a television broadcast via the antenna. The signal processing unit 8 demodulates data on the television broadcast received by the receiving unit 9, demultiplexes image data from the data thus demodulated, and outputs the image data thus demultiplexed. The liquid crystal panel 2 displays an image based on the image data outputted by the signal processing unit 8.

The liquid crystal display device 1 includes legs 7. The liquid crystal display device 1 is supported by the legs 7, placed on a flat stand, and used with the liquid crystal panel 2 having its display surface kept in an upright position. The following description assumes that the front is the display surface of the liquid crystal panel 2 and the back is a surface of the liquid crystal panel 2 opposite to the display surface. Further, the terms "upper" and "lower" used in the following description correspond to higher and lower positions in the aforementioned usage state, and the terms "right" and "left" used in the following description correspond to the right and left as seen from the front in the usage state.

Figure 3:
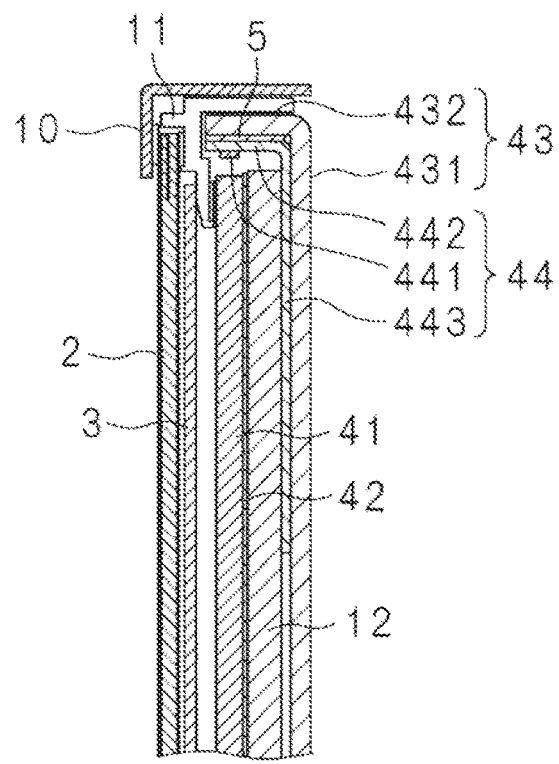
FIG. 3 is a sectional side view taken along line III-III in FIG. 1.
Figure 3:
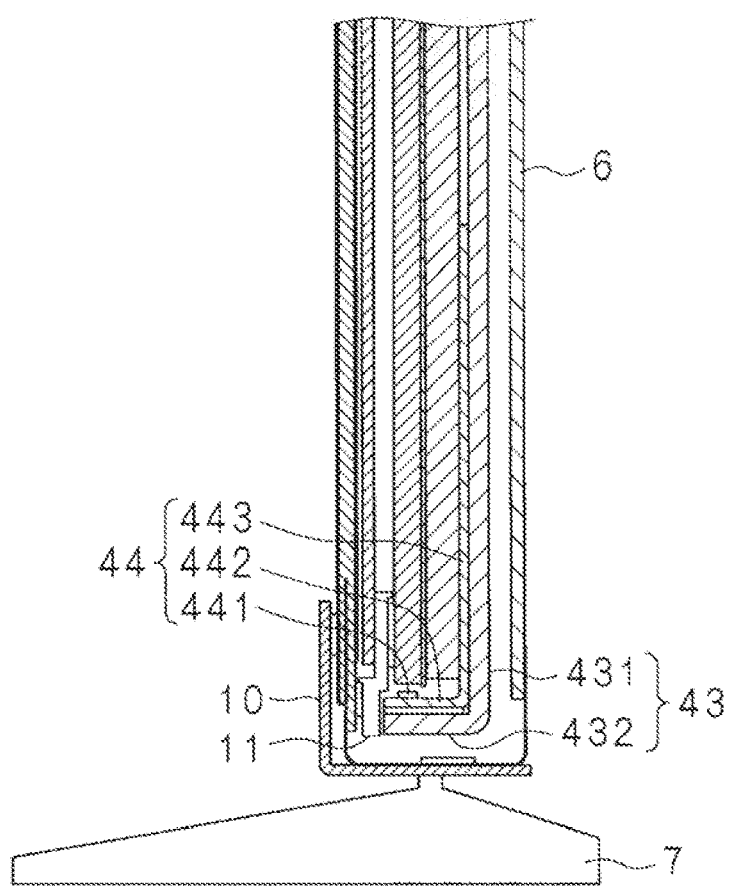

FIG. 3 is a sectional side view taken along line III-III in FIG. 1. This sectional side view shows upper and lower parts of the liquid crystal display device 1. The backlight 4 includes a light-guiding plate 41 inside the backlight chassis 43. The backlight chassis 43 is a metallic casing, molded into a shallow dish shape, that includes a rectangular bottom plate 431 whose peripheral edges are raised substantially perpendicularly to provide short side walls 432 that surround the bottom plate 431. As shown in FIG. 3, the bottom plate 431 and side walls 432 of the backlight chassis 43 have shapes of letter L's in cross section.

The light-guiding plate 41 is a flat plate made of glass or translucent resin such as acrylic resin and molded into a rectangular shape. The light-guiding plate 41 is an optical member covered with a reflective sheet 42 on a backside surface (back surface) of the flat plate, and the reflective sheet 42 covers the back surface and side surfaces of the light-guiding plate 41. The light-guiding plate 41 is accommodated in the backlight chassis 43 so as to cover substantially the whole surface of the bottom plate 431 of the backlight chassis 43 so that the surface covered with the reflective sheet 42 (back surface) faces the bottom plate 431. The light-guiding plate 41 has its front surface provided with an optical sheet group 3 composed of a plurality of optical sheets joined on top of each other.

The backlight 4 includes two light source substrates 44 provided opposite to upper and lower peripheral edges (upper and lower end faces), respectively, of the light-guiding plate 41, and illuminating light from the light source substrate 44 illuminates the liquid crystal panel 2 from behind via the light-guiding plate 41 and the optical sheet group 3.

Each of the light source substrates 44 has a shape of letter L in cross section including a rectangular plate-shaped short side part 442 and a rectangular plate-shaped long side part 443 projecting substantially perpendicularly from a first surface of the short side part 442. The short side part 442 corresponds to a short side of letter L, and the long side part 443 corresponds to a long side of letter L. That is, the length of the short side part 442 in a transverse direction is set to be smaller than the length of the long side part 443 in a transverse direction. The lengths of the light source substrates 44 in a longitudinal direction are correspondingly set to be substantially equal to the lengths of the upper and lower peripheral edges of the light-guiding plate 41.

On the first surface of the short side section 442, a plurality of light-emitting elements 441 such as LEDs (light-emitting diodes) are mounted along a longitudinal direction. Emission of light by the light-emitting elements 441 causes heat to be generated from the light source substrates 44.

Each of the light source substrates 44 is provided so that a second surface of the short side part 442 faces an inner surface of a corresponding one of the side walls 432 of the backlight chassis 43. Interposed between the second surface of the short side part 442 of the light source substrate 44 and the inner surface of the side wall 432 of the backlight chassis 43 is a double-sided tape 5 by which the light source substrate 44 is fixedly bonded to the backlight chassis 43. The double-sided tape 5 has thermal conductivity, and the light source substrate 44 and the backlight chassis 43 are thermally connected to each other via the double-sided tape 5.

The light source substrate 44 is fixed to the backlight chassis 43 so that the corner of letter L formed by the short side part 442 and long side part 443 of the light source substrate 44 is aligned with the corner of letter L formed by the bottom plate 431 and side wall 432 of the backlight chassis 43. The length of the short side part 442 of the light source substrate 44 in a width direction, i.e. the length of the short side part 442 in a transverse direction, is set to be substantially equal to the length of the side wall 432 of the backlight chassis 43, i.e. the length of a projection of the side wall 432.

The light source substrate 44 is provided so that a first surface (back surface) of the long side part 443 thereof faces an inner surface (front surface) of the bottom plate 431 of the backlight chassis 43. The light source substrate 44 is thermally connected to the backlight chassis 43 by bringing the first surface of the long side part 443 thereof into contact with the inner surface of the bottom plate 431 of the backlight chassis 43. The term "thermally connected" is not limited to bringing the first surface of the long side part 43 and the inner surface of the bottom plate 431 into direct contact with each other but encompasses, for example, a thermal connection made by interposing, between the first surface of the long side part 443 and the inner surface of the bottom plate 431, a heat-transfer enhancing member, such as grease or a thermally-conductive sheet, that enhances heat transfer.

Provided between a second surface (front surface) of the long side part 443 of the light source substrate 44, i.e. a surface that faces the liquid crystal panel 2, and the reflective sheet 42 attached to the light-guiding plate 41 is a rectangular heat sink 12. The heat sink 12 is equal in shape and substantially equal in size to the light-guiding plate 41.

The long side part 443 of the light source substrate 44 is sandwiched between the heat sink 12 and the bottom plate 431 of the backlight chassis 43, has its first surface in contact with the backlight chassis 43, and has it second surface in contact with the heat sink 12, whereby the light source substrate 44 is thermally connected to the heat sink 12 and the backlight chassis 43. The heat sink 12 and the backlight chassis 43 are each made of a highly thermal conductive metal such as aluminum, aluminum oxide, or copper, and efficiently dissipate heat generated from the light source substrate 44. Needless to say, the light source substrate 44 is electrically insulated from the heat sink 12 and the backlight chassis 43.

The liquid crystal display device 1 includes panel chassis 11 that support the liquid crystal panel 2. The panel chassis 11 are plate members, made of resin or metal such as aluminum, that have crank shapes in cross section, and are provided on upper and lower sides, respectively, of the liquid crystal panel 2. Each of these panel chassis 11 has one end interposed between an optical sheet and the light-guiding plate 41 to function as a spacer. The upper panel chassis 11 includes a side piece that covers an outer side of a corresponding one of the side walls 432 of the backlight chassis 43, i.e. an outer surface of the side wall 432.

A bezel 10 is provided so as to cover peripheral edges of a front side of the liquid crystal panel 2. The liquid crystal display device 1 includes a box-shaped cover 6. The cover 6 is disposed on a lower side of the liquid crystal panel 2, and is provided so as to cover the backlight chassis 43 from behind.

Light emitted by the light-emitting elements 441 enters the light-guiding plate 41 through the upper and lower peripheral edges facing the upper and lower light source substrates 44, travels through the inside of the light-guiding plate 41 while repeating total reflection at the reflective sheet 42 covering the back surface of the light-guiding plate 41 and partial reflection at the front surface of the light-guiding plate 41, and is emitted entirely across the front surface of the light-guiding plate 41. This emitted light is diffused by the optical sheet group 3 and illuminates the liquid crystal panel 2 from behind, and the liquid crystal panel 2 modulates and transmits emitted light from the backlight 4 by driving liquid crystals sealed inside and displays an image on the front surface (front).

Each of the light source substrates 44 has a shape of letter L in cross section formed by the short side part 442 and the long side part 443, and the first surface of the long side part 443 faces in thermal contact with the inner surface of the bottom plate 431 of the backlight chassis 43. This makes it possible to increase a heat transfer area between the light source substrate 44 and the backlight chassis 43 so that heat generated from the light source substrate 44 can be efficiently transferred to the backlight chassis 43. Since the backlight chassis 43 constitutes the exterior body of the liquid crystal display device 1, the backlight chassis 43 can efficiently exchange heat with air around the liquid crystal display device 1 to efficiently dissipate heat generated from the light source substrate 44.

Since the light-emitting elements 441 are mounted on the first surface of the short side part 442 of the light source substrate 44, a reduction in thickness of the liquid crystal display device 1 can be achieved by reducing the length of the short side part 442 in a transverse direction while increasing the mounting area of the light source substrate 44.

Since the heat sink 12 is provided opposite to the second surface (front surface) of the long side part 443 of each of the light source substrates 44 so that the second surface of the long side part 443 and the heat sink 12 are in thermal contact with each other, heat generated from the light source substrate 44 can be dissipated via the heat sink 12. That is, heat generated from the light source substrate 44 can be efficiently dissipated by sandwiching the long side part 443 of the light source substrate 44 between the bottom of the backlight chassis 43 and the heat sink 12.

The light source substrate 44 and the backlight chassis 43 are fixedly bonded to each other with the double-side tape 5 interposed between the second surface of the short side part 442 of the light source substrate 44 and the inner surface of the side wall 432 of the backlight chassis 43. Since the double-sided tape 5 has thermal conductivity, heat generated from the light source substrate 44 can be further efficiently transferred to the backlight chassis 43 by further increasing the heat transfer area between the light source substrate 44 and the backlight chassis 43 by bringing the short side part 442 of the light source substrate 44 and the inner surface of the side wall 432 of the backlight chassis 43 into thermal contact with each other.

The corner of letter L formed by the short side part 442 and long side part 443 of the light source substrate 44 is aligned with the corner of letter L formed by the bottom plate 431 and side wall 432 of the backlight chassis 43, and the length of the short side part 442 in a transverse direction is set to be substantially equal to the length of a projection (height of a rising) of the side wall 432. This makes it possible to achieve a reduction in thickness of the liquid crystal display device 1 while increasing the mounting area of the light source substrate 44.

Two such light source substrates 44 are provided opposite to the upper and lower peripheral edges (upper and lower end faces), respectively, of the light-guiding plate 41. This makes it possible to achieve a reduction in thickness of the liquid crystal display device 1 with the cross-sectionally L-shaped light source substrates 44 while achieving an increase in luminance.

Embodiment 2

Figure 4:
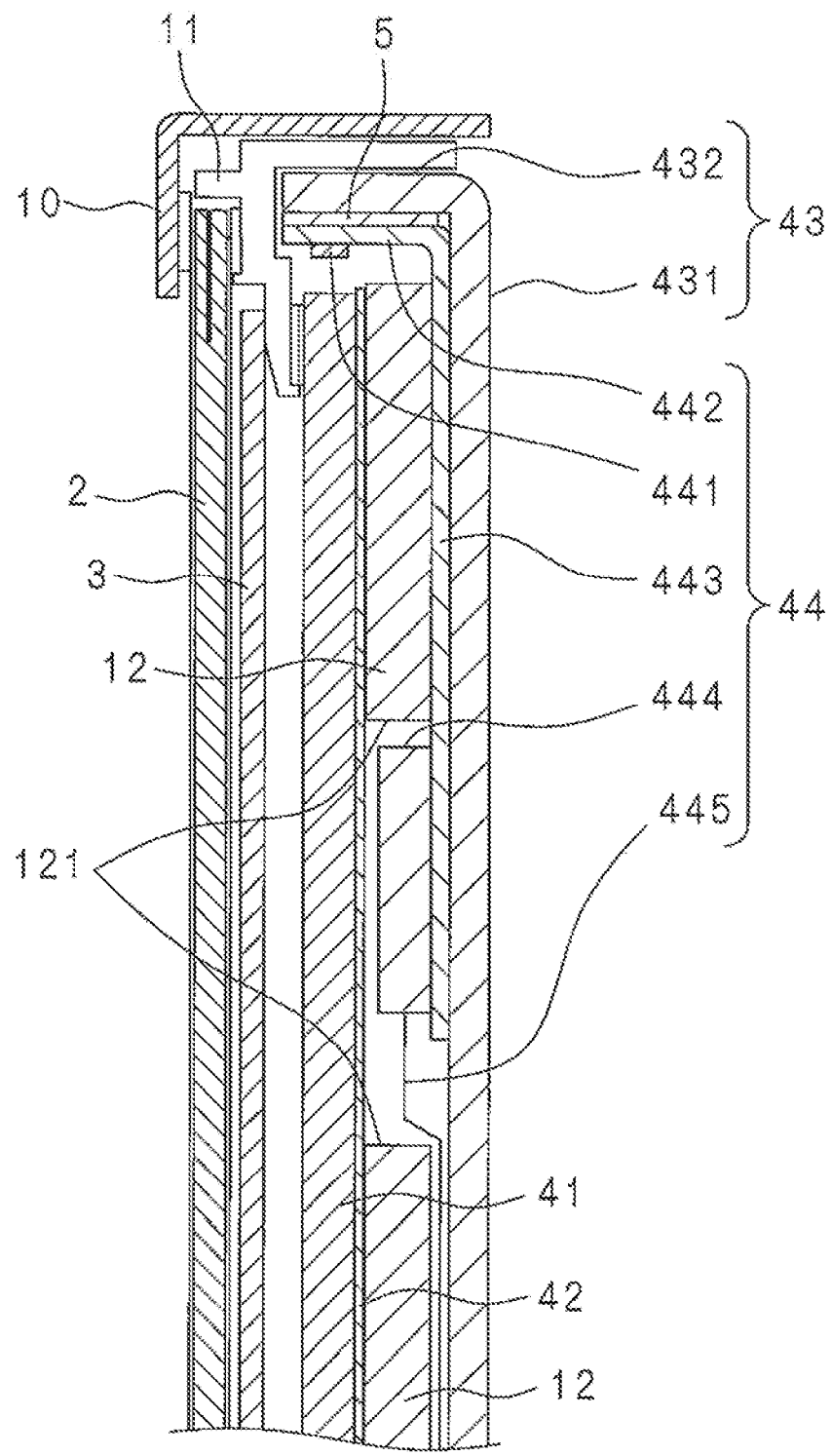
FIG. 4 is a side view schematically showing the main components of a display device according to Embodiment 2 (hole in heat sink)

FIG. 4 is a side view schematically showing the main components of a display device according to Embodiment (hole in heat sink). FIG. 4 shows a liquid crystal panel 2, a light-guiding plate 41, a backlight chassis 43, a heat sink 12, and a light source substrate 44. As in Embodiment 1, the light source substrate 44 has a shape of letter L in cross section including a short side part 442 and a long side part 443.

Provided at a leading end of the second surface of the long side part 443 of the light source substrate 44 is a connector 444 for making a connection with a controller (not illustrated) that controls the light source substrate 44. The connector 444 and the controller are electrically connected to each other by a harness 445. The harness 445 is disposed in a gap between a back surface of the heat sink 12 and the inner surface of the bottom plate 431 of the backlight chassis 43.

The connector 444 is provided so as to be located inside a hole 121 provided in the heat sink 12. The shape of the hole 121 of the heat sink 12 is a shape that corresponds to the shape of the connector 44 in a plan view. The connector 444 is rectangular in cross section, and the thickness of the connector 444, i.e. the height of the connector 444 from the second surface of the long side part 443 of the light source substrate 44, is set to be smaller than the plate thickness of the heat sink 12.

The provision of the connector 444 on the second surface of the long side part 443 of the light source substrate 44 makes it unnecessary to provide the connector 444 on the short side part 442 of the light source substrate 44 on which the light-emitting elements 441 are mounted, and makes it possible to reduce the length of the shot side part 442 in a transverse direction. By reducing the length of the shot side part 442 in a transverse direction, a reduction in thickness of the liquid crystal display device 1 can be achieved.

The connector 444 is provided at the leading end of the second surface of the long side part 443 of the light source substrate 44, i.e. in a location away from the corner formed by the long side part 443 and the short side part 442. Accordingly, the hole 121 of the heat sink 12 that corresponds to the connector 444 too is provided in a location away from the corner. This makes it possible to increase the distance between the light-emitting elements 441 located near the corner and the hole 121 of the heat sink 12. While the hole 121 of the heat sink 12 causes the heat sink 12 to have a smaller heat dissipation area, deterioration in heat dissipation capacity due to the presence of the hole 121 can be reduced by increasing the distance between the hole 121 and the light-emitting elements 441.

The harness 445, by which the connector 444 and the controller are electrically connected to each other, is disposed in the gap between the back surface of the heat sink 12 and the inner surface of the bottom plate 431 of the backlight chassis 43, and this gap is attributed to the plate thickness of the long side part 443 of the light source substrate 44. This makes it possible with a simple structure to dispose the harness 445.

Embodiment 3

Figure 5:
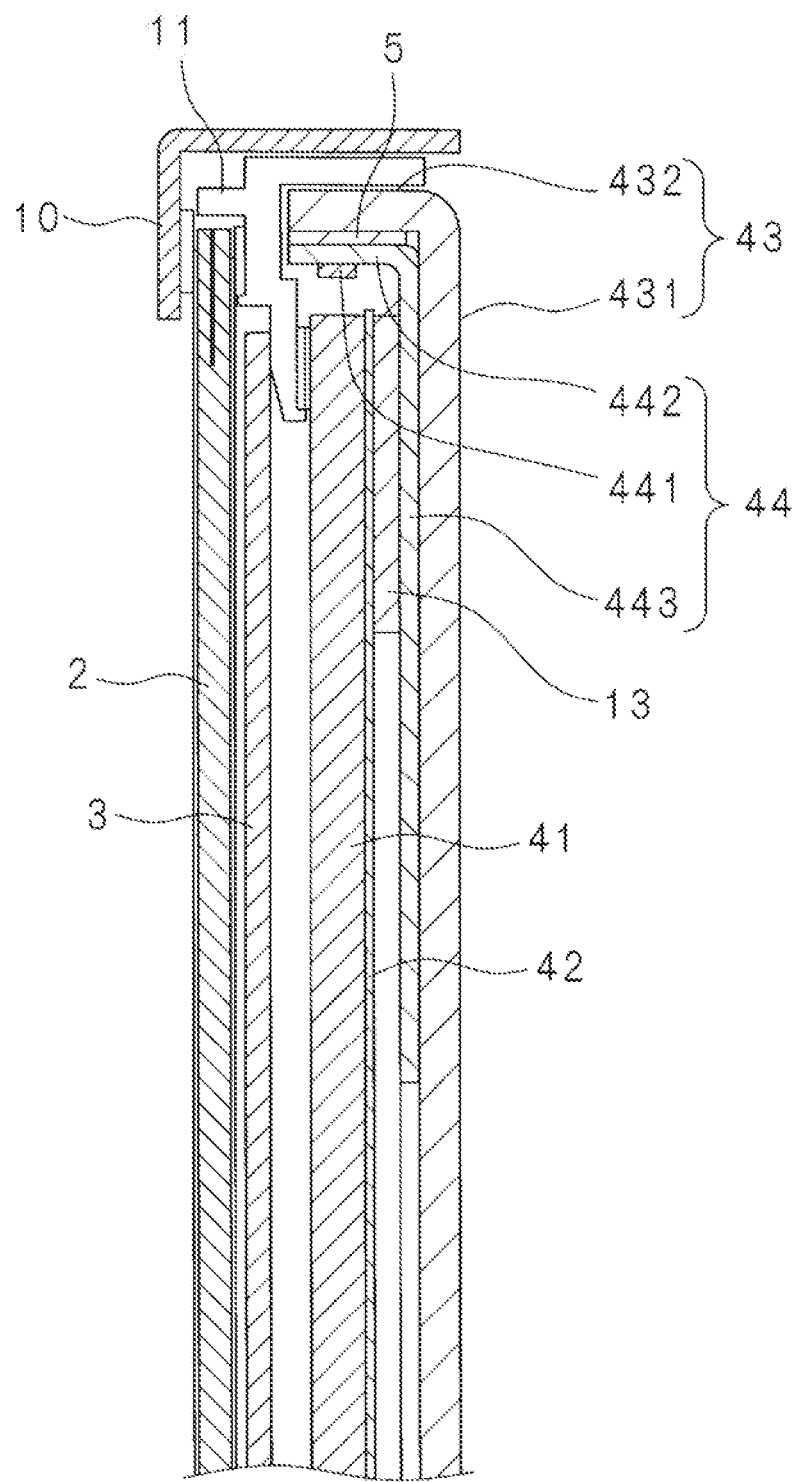
FIG. 5 is a side view schematically showing the main components of a display device according to Embodiment 3 (spacer).

FIG. 5 is a side view schematically showing the main components of a display device according to Embodiment 3 (spacer). FIG. 5 shows a liquid crystal panel 2, a light-guiding plate 41, a backlight chassis 43, and a light source substrate 44. As in Embodiment 1, the light source substrate 44 has a shape of letter L including a short side part 442 and a long side part 443.

In Embodiment 1, the heat sink 12 is provided between the second surface of the long side part 443 of the light source substrate 44 and the reflective sheet 42 attached to the light-guiding plate 41. However, this is not intended to impose any limitation. A space 13 may be provided between the second surface of the long side part 443 of the light source substrate 44 and the reflective sheet 42 attached to the light-guiding plate 41, and by the spacer 13, the long side part 443 of the light source substrate 44 and the reflective sheet 42 may be kept a predetermined distance from each other.

Since the thickness of the spacer 13 is set to be smaller than the plate thickness of the heat sink 12, a further reduction in thickness of the liquid crystal display device 1 can be achieved.

A display device according to an embodiment of the present disclosure includes: a display panel 2 that displays an image on a front thereof; a light-guiding plate 41 placed opposite to a back of the display panel 2; a storage container 43 in which the light-guiding plate 41 is stored, the storage container 43 having a dish shape; a light-emitting element 441 that supplies the display panel 2 with light; and a light source substrate 44 having a short side part 442 on a first surface of which the light-emitting element 441 is mounted and a long side part 443 projecting inward from the first surface of the short side part 442, the first surface of the short side part 442 being disposed to face a peripheral edge of the light-guiding plate 41, the light source substrate 44 having a shape of letter L in cross section. In the display device, the long side part 443 of the light source substrate 44 and a bottom plate 431 of the storage container 43 are thermally connected to each other.

The present embodiment makes it possible to, while increasing the mounting area of the light source substrate 44 by forming the substrate in a shape of letter L in cross section, reduce the width of the display device by mounting the light-emitting element 441 on the first surface of the short side part 442 of the cross-sectionally L-shaped light source substrate 44. The thermal connection between the long side part 443 of the cross-sectionally L-shaped light source substrate 44 and the bottom plate 431 of the storage container 43 increases a heat transfer area between the light source substrate 44 and the bottom plate 431 so that heat generated from the light source substrate 44 can be efficiently transferred to and efficiently dissipated by the bottom plate 431.

A display device according to an embodiment of the present disclosure further includes a heat sink 12 provided between the light-guiding plate 41 and the long side part 443 of the light source substrate 44. In the display device, the long side part 443 of the light source substrate 44 is sandwiched between the heat sink 12 and the bottom plate 431 of the storage container 43 so that the light source substrate 44 is thermally connected to the heat sink 12 and the storage container 43.

According to the present embodiment, the long side part 443 of the light source substrate 44 is sandwiched between and thermally connected to the heat sink 12 and the bottom plate 431 of the storage container 43. This increases heat transfer areas between the light source substrate 44 and the bottom plate 431 and between the light source substrate 44 and the heat sink 12 so that heat generated from the light source substrate 44 can be efficiently transferred to and dissipated by the bottom plate 431 and the heat sink 12.

A display device according to an embodiment of the present disclosure further includes a connector 444 provided on a first surface of the long side part 443 of the light source substrate 44 that faces the display panel 2. In the display device, the connector 444 is disposed inside a hole 121 provided in the heat sink 12.

According to the present embodiment, the hole 121 of the heat sink 12 in which to place the connector 444 provided on the long side part 443 of the light source substrate 44 is located at a distance away from the light-emitting element 441 mounted on the short side part 442 of the light source substrate 44. This makes it possible to reduce deterioration in heat dissipation capacity due to the presence of the hole 121.

In a display device according to an embodiment of the present disclosure, the short side part 442 of the light source substrate 44 has a second surface that faces an inner surface of a side wall 432 of the storage container 43, and the short side part 442 of the light source substrate 44 and the side wall 432 of the storage container 43 are thermally connected to each other.

According to the present embodiment, the short side part 442 of the light source substrate 44 and the side wall 432 of the storage container 43 are thermally connected to each other. This increases a heat transfer area between the light source substrate 44 and the bottom plate 431 so that heat generated from the light source substrate 44 can be efficiently transferred to and efficiently dissipated by the bottom plate 431.

In a display device according to an embodiment of the present disclosure, the light source substrate 44 is disposed at each of upper and lower peripheral edges of the light-guiding plate 41.

According to the present embodiment, the light source substrate 44 is disposed at each of the upper and lower peripheral edges of the light-guiding plate 41. This makes it possible to achieve a reduction in width (reduction in thickness) of the display device with the cross-sectionally L-shaped light source substrate 44 while achieving an increase in luminance.

In a display device according to an embodiment of the present disclosure, the storage container 43 and the heat sink 12 are each made of aluminum, aluminum oxide, or copper.

According to the present embodiment, the storage container 43 and the heat sink 12 are each made of aluminum, aluminum oxide, or copper. This improves the thermal conductivity of the storage container 43 and the heat sink 12 so that heat generated by the light source substrate 44 can be efficiently dissipated.

A television receiver according to an embodiment of the present disclosure includes: a display device according to an embodiment of the present disclosure; and a receiving unit 9 that receives a television broadcast. In the television receiver, the display panel 2 displays an image based on the television broadcast received by the receiving unit 9.

The present embodiment makes it possible with use of the aforementioned display device to provide a television receiver that can efficiently dissipate heat with a simple structure.

The embodiments disclosed herein are examples in all respects and should be considered as not limitative. The scope of the present disclosure is shown not by the aforementioned meanings but by the scope of the claims, and is intended to encompass all alterations falling within the meaning and range of equivalents of the scope of the claims.

The present disclosure contains subject matter related to that disclosed in Japanese Priority Patent Application JP 2018-029125 filed in the Japan Patent Office on Feb. 21, 2018, the entire contents of which are hereby incorporated by reference.

What is claimed is:

1. A display device comprising:
    a display panel that displays an image on a front thereof;
    a light-guiding plate placed opposite to a back of the display panel;
    a storage container in which the light-guiding plate is stored, the storage container having a dish shape;
    a light-emitting element that supplies the display panel with light;
    a light source substrate having a short side part on a first surface of which the light-emitting element is mounted and a long side part projecting inward from the first surface of the short side part, the first surface of the short side part being disposed to face a peripheral edge of the light-guiding plate, the light source substrate having a shape of letter L in cross section; and
    a heat sink provided between the light-guiding plate and the long side part of the light source substrate,
    wherein the long side part of the light source substrate and a bottom plate of the storage container are thermally connected to each other, and
    the long side part of the light source substrate is sandwiched between the heat sink and the bottom plate of the storage container so that the light source substrate is thermally connected to the heat sink and the storage container.

2. The display device according to claim 1, further comprising a connector provided on a first surface of the long side part of the light source substrate that faces the display panel,
    wherein the connector is disposed inside a hole provided in the heat sink.

3. The display device according to claim 1, wherein the short side part of the light source substrate has a second surface that faces an inner surface of a side wall of the storage container, and
    the short side part of the light source substrate and the side wall of the storage container are thermally connected to each other.

4. The display device according to claim 1, wherein the light source substrate is disposed at each of upper and lower peripheral edges of the light-guiding plate.

5. The display device according to claim 1, wherein the storage container and the heat sink are each made of aluminum, aluminum oxide, or copper.

6. A television receiver comprising:
    the display device according to claim 1; and
    a receiving unit that receives a television broadcast,
    wherein the display panel displays an image based on the television broadcast received by the receiving unit.

* * * * *